US007922965B2

(12) United States Patent
Kuntz et al.

(10) Patent No.: US 7,922,965 B2
(45) Date of Patent: Apr. 12, 2011

(54) SLIP CASTING NANO-PARTICLE POWDERS FOR MAKING TRANSPARENT CERAMICS

(75) Inventors: Joshua D. Kuntz, Livermore, CA (US); Thomas F. Soules, Livermore, CA (US); Richard Lee Landingham, Livermore, CA (US); Joel P. Hollingsworth, Oakland, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 104 days.

(21) Appl. No.: 12/465,708

(22) Filed: May 14, 2009

(65) Prior Publication Data

US 2009/0283925 A1 Nov. 19, 2009

Related U.S. Application Data

(60) Provisional application No. 61/054,394, filed on May 19, 2008.

(51) Int. Cl.
*C04B 33/28* (2006.01)

(52) U.S. Cl. .......................... 264/651; 264/86; 501/152

(58) Field of Classification Search .................. None
See application file for complete search history.

(56) References Cited

U.S. PATENT DOCUMENTS

| | | | | |
|---|---|---|---|---|
| 2004/0167010 | A1* | 8/2004 | Sato et al. | 501/152 |
| 2006/0087062 | A1* | 4/2006 | Laine et al. | 264/645 |
| 2006/0100088 | A1* | 5/2006 | Loureiro et al. | 501/152 |
| 2007/0296103 | A1 | 12/2007 | Hayes et al. | |
| 2008/0090716 | A1 | 4/2008 | Cherepy et al. | |
| 2008/0106010 | A1* | 5/2008 | Gratson et al. | 264/633 |
| 2008/0164402 | A1* | 7/2008 | Menke et al. | 249/102 |
| 2009/0108507 | A1* | 4/2009 | Messing et al. | 264/605 |
| 2010/0048378 | A1* | 2/2010 | Tang et al. | 501/133 |

* cited by examiner

*Primary Examiner* — Mary Lynn F Theisen
(74) *Attorney, Agent, or Firm* — Eddie E. Scott; James S. Tak

(57) ABSTRACT

A method of making a transparent ceramic including the steps of providing nano-ceramic powders in a processed or unprocessed form, mixing the powders with de-ionized water, the step of mixing the powders with de-ionized water producing a slurry, sonifing the slurry to completely wet the powder and suspend the powder in the de-ionized water, separating very fine particles from the slurry, molding the slurry, and curing the slurry to produce the transparent ceramic.

24 Claims, 8 Drawing Sheets

SLIP CASTING NANO-PARTICLE POWDERS FOR MAKING TRANSPARENT CERAMICS

CROSS-REFERENCE TO RELATED APPLICATIONS

The present application claims benefit under 35 U.S.C. §119(e) of U.S. Provisional Patent Application No. 61/054,394 filed May 19, 2008 entitled "Slip Casting Nano-particle Powders for Making Transparent Ceramics," the disclosure of which is hereby incorporated by reference in its entirety for all purposes.

STATEMENT AS TO RIGHTS TO INVENTIONS MADE UNDER FEDERALLY SPONSORED RESEARCH AND DEVELOPMENT

The United States Government has rights in this invention pursuant to Contract No. DE-AC52-07NA27344 between the United States Department of Energy and Lawrence Livermore National Security, LLC for the operation of Lawrence Livermore National Laboratory.

BACKGROUND

1. Field of Endeavor

The present invention relates to ceramics and more particularly to making transparent ceramics.

2. State of Technology

United States Published Patent Application No. 2007/0296103 for filter casting nanoscale porous materials published Dec. 27, 2007 provides the following state of technology information in the abstract: "A method of producing nanoporous material includes the steps of providing a liquid, providing nanoparticles, producing a slurry of the liquid and the nanoparticles, removing the liquid from the slurry, and producing a monolith."

United States Published Patent Application No. 2008/0090716 for Fabrication of transparent ceramics using nanoparticles published Apr 17, 2008 provides the following state of technology information in the abstract: "A method of fabrication of a transparent ceramic using nanoparticles synthesized via organic acid complexation-combustion includes providing metal salts, dissolving said metal salts to produce an aqueous salt solution, adding an organic chelating agent to produce a complexed-metal sol, heating said complexed-metal sol to produce a gel, drying said gel to produce a powder, combusting said powder to produce nano-particles, calcining said nano-particles to produce oxide nano-particles, forming said oxide nano-particles into a green body, and sintering said green body to produce the transparent ceramic."

SUMMARY

Features and advantages of the present invention will become apparent from the following description. Applicants are providing this description, which includes drawings and examples of specific embodiments, to give a broad representation of the invention. Various changes and modifications within the spirit and scope of the invention will become apparent to those skilled in the art from this description and by practice of the invention. The scope of the invention is not intended to be limited to the particular forms disclosed and the invention covers all modifications, equivalents, and alternatives falling within the spirit and scope of the invention as defined by the claims.

The present invention provides a method of making a transparent ceramic. The method includes the steps of providing nano-ceramic powders in a processed or unprocessed form, mixing the powders with de-ionized water, the step of mixing the powders with de-ionized water producing a slurry, sonifing the slurry to completely wet the powder and suspend the powder in the de-ionized water, separating very fine particles from the slurry, molding the slurry, and curing the slurry to produce the transparent ceramic. The present invention has many uses. For example, the present invention has use in fabrication of laser gain media slabs and other ceramic laser components.

The invention is susceptible to modifications and alternative forms. Specific embodiments are shown by way of example. It is to be understood that the invention is not limited to the particular forms disclosed. The invention covers all modifications, equivalents, and alternatives falling within the spirit and scope of the invention as defined by the claims.

BRIEF DESCRIPTION OF THE DRAWINGS

The accompanying drawings, which are incorporated into and constitute a part of the specification, illustrate specific embodiments of the invention and, together with the general description of the invention given above, and the detailed description of the specific embodiments, serve to explain the principles of the invention.

DETAILED DESCRIPTION OF SPECIFIC EMBODIMENTS

Figure 1A:
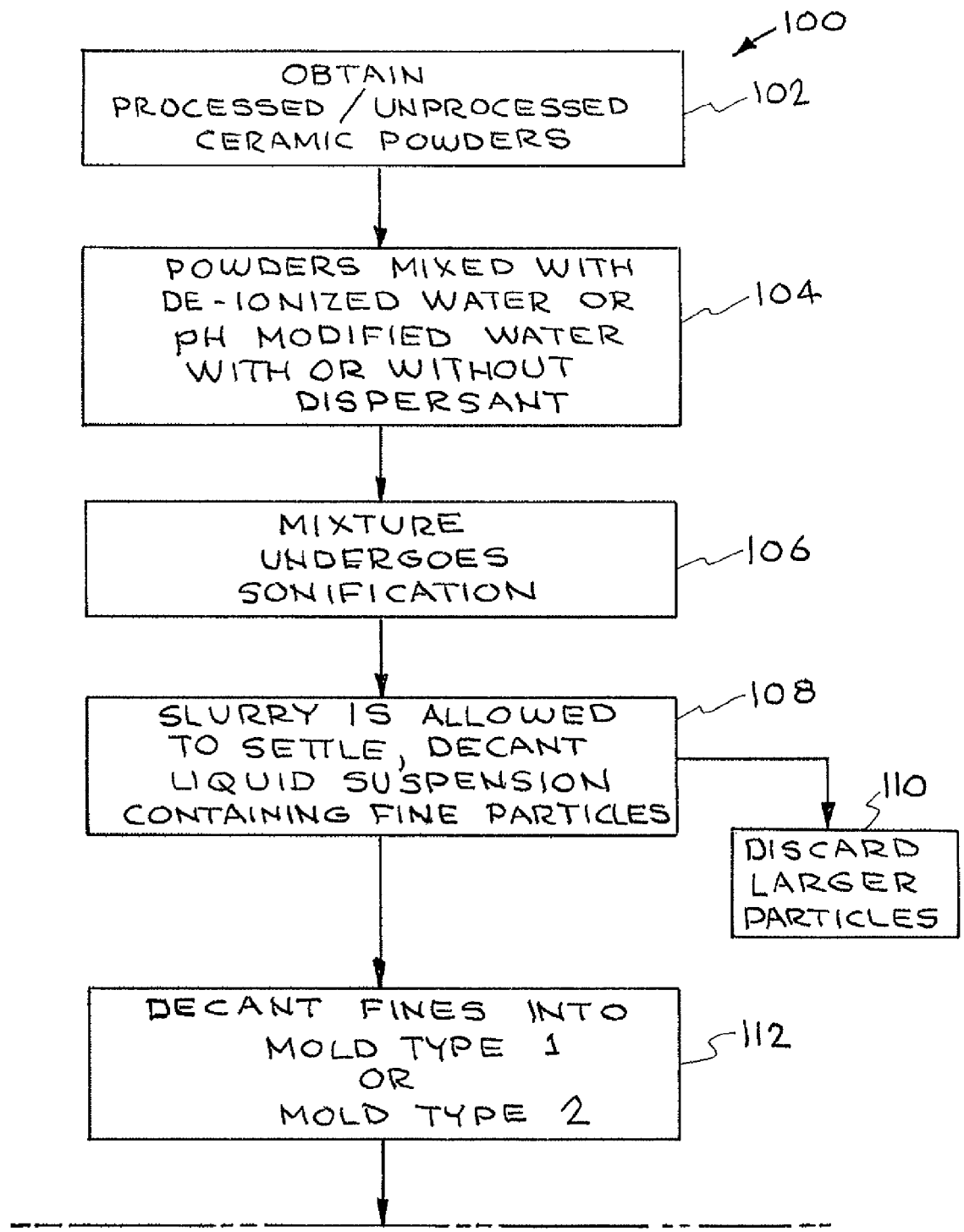
FIGS. 1A and 1B show a flow chart outlining one embodiment of a method of slip casting flame-spray pyrolysis (FSP) nano-ceramic particles.

Referring to the drawings, to the following detailed description, and to incorporated materials, detailed information about the invention is provided including the description of specific embodiments. The detailed description serves to explain the principles of the invention. The invention is susceptible to modifications and alternative forms. The invention is not limited to the particular forms disclosed. The invention covers all modifications, equivalents, and alternatives falling within the spirit and scope of the invention as defined by the claims.

Figure 1B:
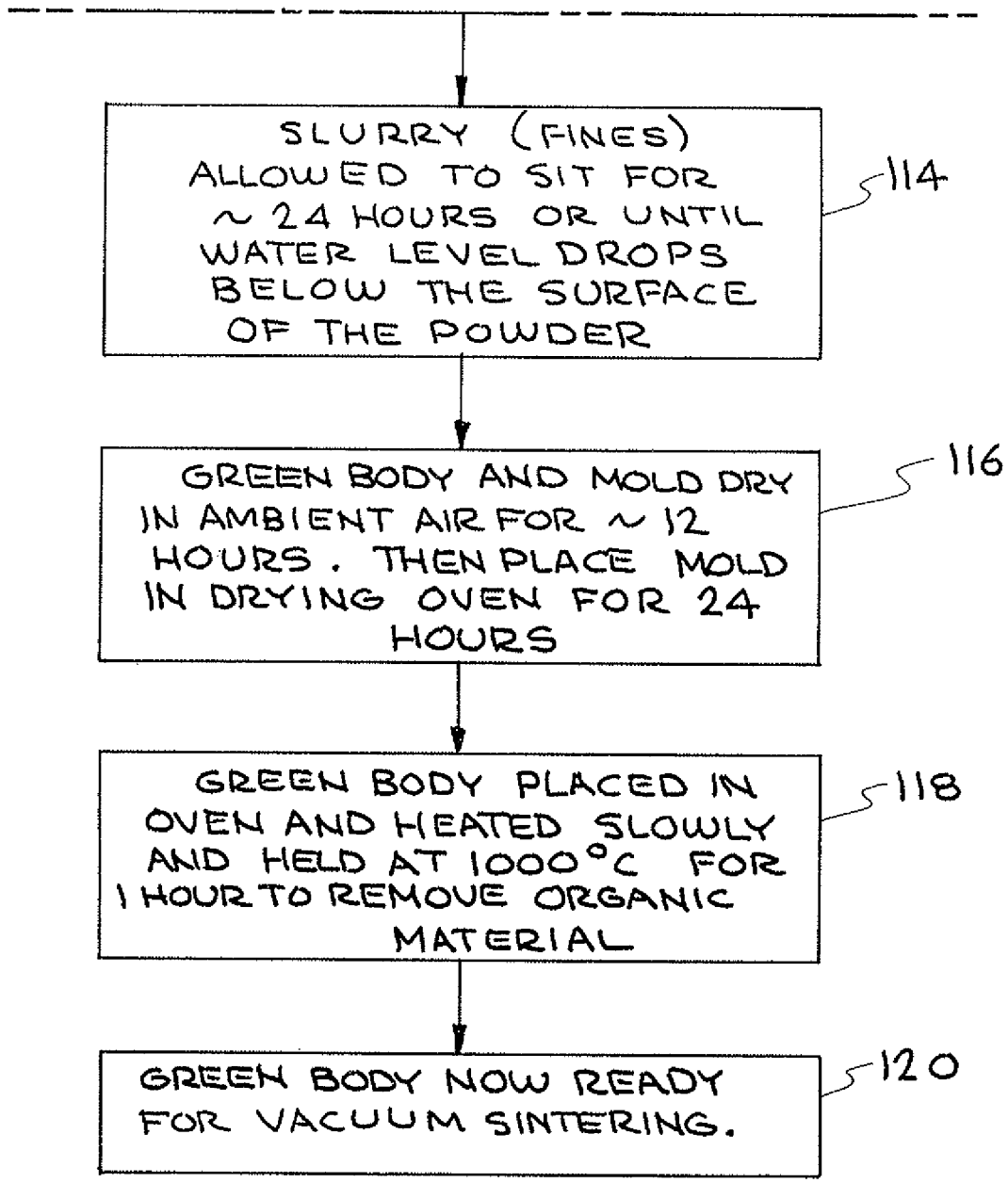

Referring now to the drawings and in particular to FIGS. 1A and 1B a flow chart outlining one embodiment of a method of slip casting flame-spray pyrolysis (FSP) nano-ceramic particles is shown. The method is designated generally by the reference numeral 100. The method 100 is a method of making a transparent ceramic that includes the steps of providing nano-ceramic powders in a processed or unprocessed form, mixing the powders with de-ionized water, the step of mixing the powders with de-ionized water producing a slurry, sonifing the slurry to completely wet the powder and suspend the powder in the de-ionized water, separating very fine particles from the slurry, molding the slurry, and curing the slurry to produce the transparent ceramic. As used in this application the term "very fine particles" means particles of substantially 5-20 nm in diameter.

As illustrated in FIG. 1A, step 102 is to provide FSP particles in a processed or unprocessed form. The FSP powders are very small, typically 5-20 nm in diameter, they will tend to remain in suspension and are difficult to dewater. The processed or unprocessed powders are prepared by the combustion of organometallic compounds that are then heated, calcined, to remove organics. In the case of the processed powders the powder is further heated to form the garnet phase. It is then mixed with a binder and finely divided silica and freeze dried. The processing produces a granulated form that is easier to cold press. One example of providing FSP powders providing FSP powders obtained from Nanocerox, Inc. Nanocerox, Inc. is a source of powders produced by flame spray pyrolysis (FSP) process developed at the University of Michigan for the direct, large-scale production of inexpensive, mixed-metal oxide nanopowders.

In step 104 the powders are mixed with deo-ionized water or PH modified water. For example, the powders may be mixed with de-ionized water in the weight ratio of 5.3 parts powder to 35 parts water. Since the density of powder is typically ~5 g/cm$^3$, this corresponds to a volume fraction of water of ~50%. Dispersants may also be added at this step.

In step 106 the resultant slurry is then sonified using an ultrasonic horn immersed in the slurry or using a high shear mixer. This step will completely wet the powder and suspend it in the water.

In step 108 very fine particles are separated from the slurry. In step 108 the slurry is allowed to settle. The liquid suspension containing the fine particles is decanted. The larger particles which have settled out of the fine particle suspension are then discarded as illustrated by the step 110.

In a one embodiment of the method 100, the slurry is shaken and allowed to settle for 5 minutes. The liquid suspension containing the fine particles is decanted and the larger particles which settle are discarded. In this way only the smallest nano-particles are used for forming the ceramic. Alternatively, the suspension can be placed between electrodes in an electrophoresis apparatus. Operating the electrophoresis for one minute will result in the larger particles being deposited on the electrode. These are then discarded and the remaining suspension of very fine particles is used in subsequent process steps. The pH of the suspensions containing the finest particles from either of the classification schemes is adjusted to 11 by adding ammonia to the suspension. A flocculant, dispersant or binder that can easily be burned out, such as, polyacrylamide, can also be added to aid in the subsequent slip-casting.

In step 112 the very fine particles are decanted into molds. Two types of molds have been used in this process and they will be described in detail subsequently in connection with FIGS. 3, 4, 5, and 6.

As illustrated in FIG. 1B, in step 114 the very fine particles are decanted into a mold to a height approximately 3-7 times of desired final thickness. The very fine particles are allowed to sit for ~24 hours. During this time the water will be drained from the slurry into the absorbent mediums used in the molds. Step 114 produces a green body.

In step 116 the green body and mold are allowed to dry in ambient air for ~12 hours. The mold is then placed in a drying oven at 55° C. for another 24 hours. The green body is removed from the mold. To remove the green body the wall or tube is lifted.

In step 118 the green body is placed in an oven in air and heated slowly at 1 degree/minute to 1000 C and held for 1 hour. This heating is to remove any organic material from the casting process.

In step 120 the green body is ready for vacuum sintering. In step 120 the green body is sintered to produce the transparent ceramic. The transparent ceramic has many uses. For example, ceramic parts formed by the method 100 can be used as laser parts. The transparent ceramic can be used for laser gain media slabs, other ceramic laser components.

Figure 2A:
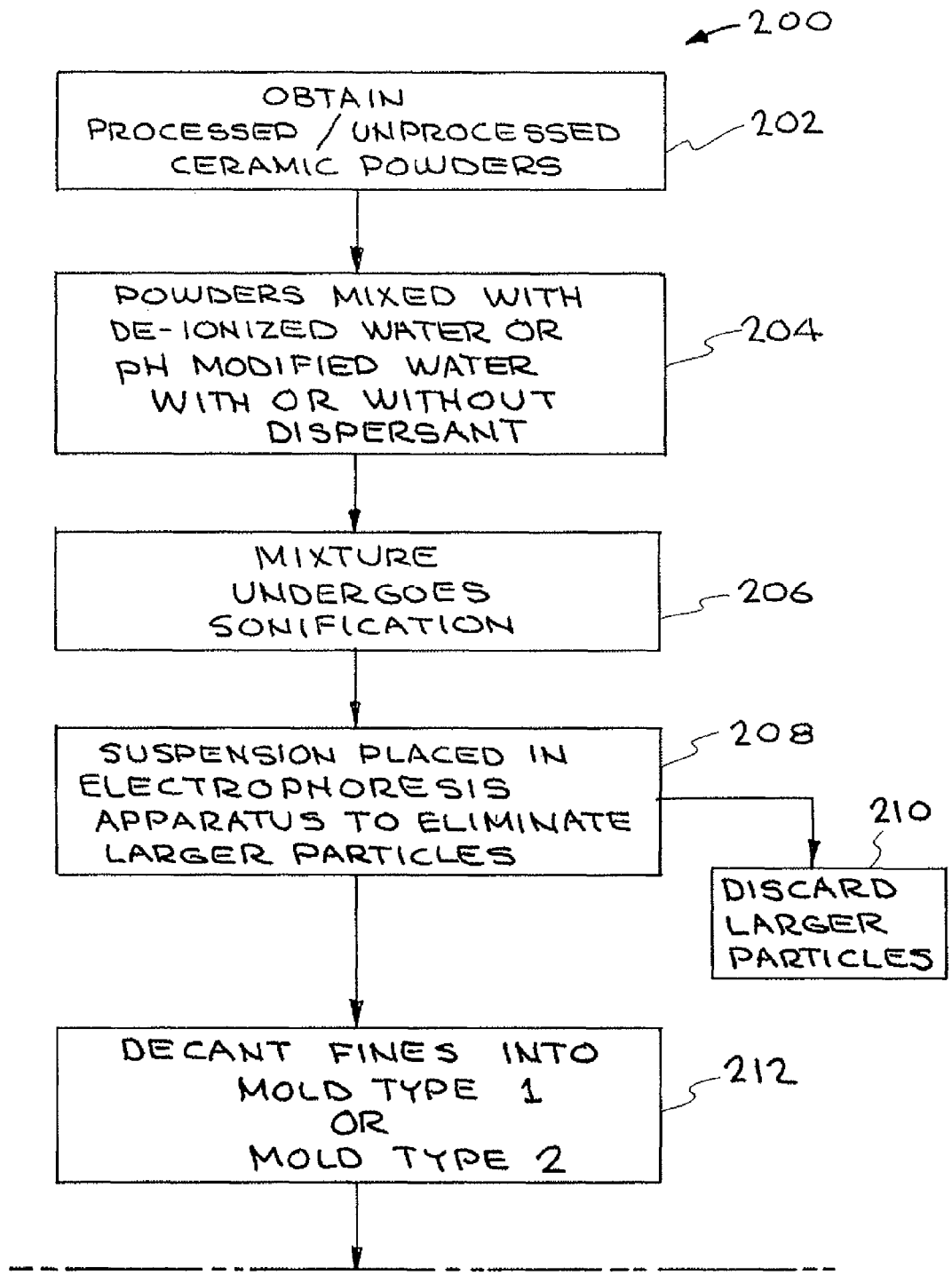
FIGS. 2A and 2B show a flow chart outlining another embodiment of a method of slip casting flame-spray pyrolysis (FSP) nano-ceramic particles.
Figure 2B:
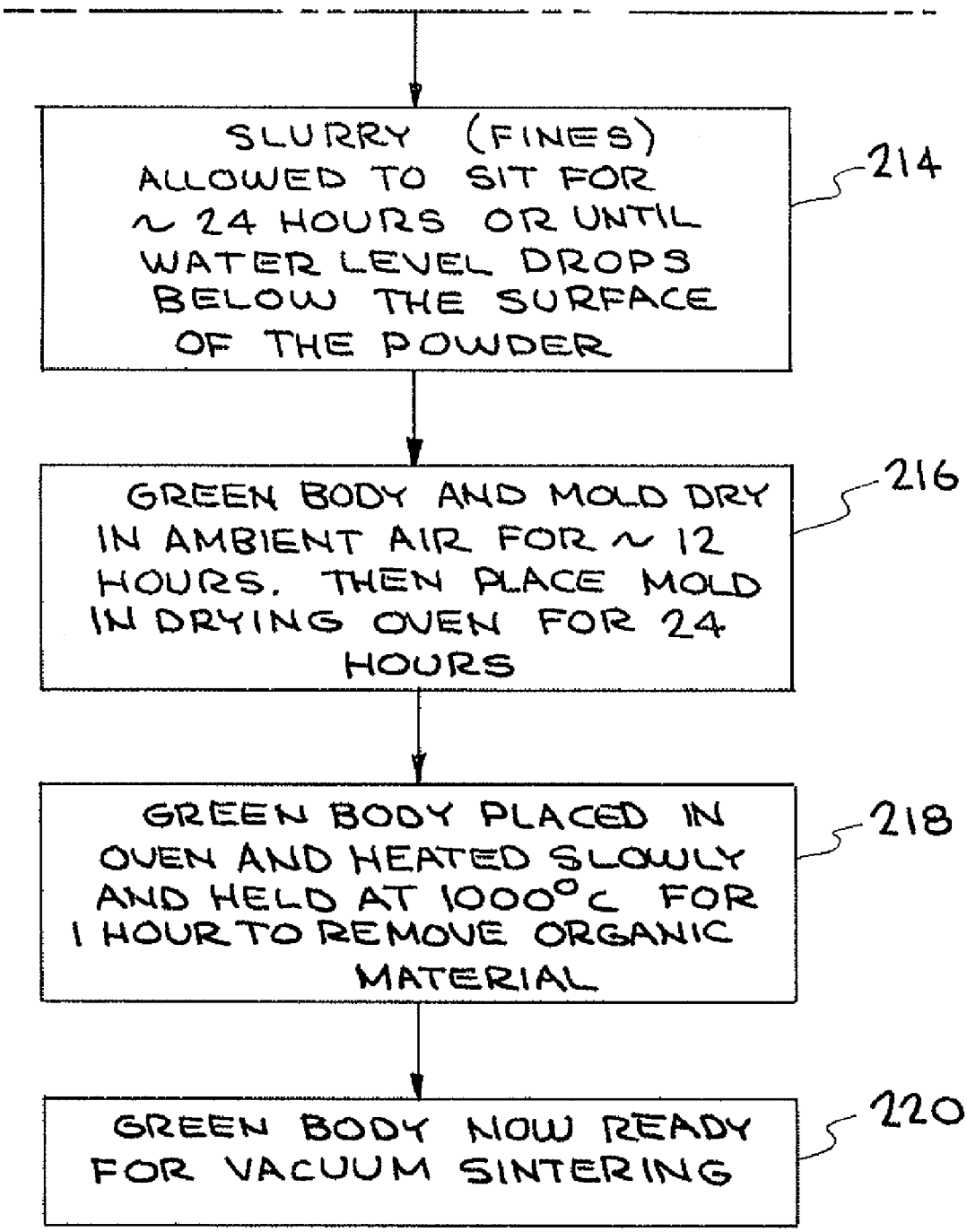

Referring now to FIGS. 2A and 2B a flow chart outlining another embodiment of a method of slip casting flame-spray pyrolysis (FSP) nano-ceramic particles is shown. The method is designated generally by the reference numeral 200. As illustrated in FIG. 2A, step 202 is to provide FSP particles in a processed or unprocessed form. The FSP powders are very small, typically 5-20 nm in diameter, they will tend to remain in suspension and are difficult to dewater. The processed or unprocessed powders are prepared by the combustion of organometallic compounds that are then heated, calcined, to remove organics. In the case of the processed powders the powder is further heated to form the garnet phase. It is then mixed with a binder and finely divided silica and freeze dried. The processing produces a granulated form that is easier to cold press. One example of providing FSP powders providing FSP powders obtained from Nanocerox, Inc. Nanocerox, Inc. is a source of powders produced by flame spray pyrolysis (FSP) process developed at the University of Michigan for the direct, large-scale production of inexpensive, mixed-metal oxide nanopowders.

In step 204 the powders are mixed with deo-ionized water or PH modified water. For example, the powders may be mixed with de-ionized water in the weight ratio of 5.3 parts powder to 35 parts water. Since the density of powder is typically ~5 g/cm$^3$, this corresponds to a volume fraction of water of ~50%. Dispersants may also be added at this step.

In step 206 the resultant slurry is then sonified using an ultrasonic horn immersed in the slurry or using a high shear mixer. This step will completely wet the powder and suspend it in the water.

In step 208 very fine particles are separated from the slurry. In step 208 the slurry is placed between electrodes in an electrophoresis apparatus. Operating the electrophoresis for one minute will result in the larger particles being deposited on the electrode. These are then discarded and the remaining suspension of very fine particles is used in subsequent process steps. The larger particles which have settled out of the fine particle suspension are then discarded as illustrated by the step 210.

In step 212 the very fine particles are decated into mold type 1 or mold type 2. Two types of molds have been used in this process and they will be described in detail subsequently in connection with FIGS. 3, 4, 5, and 6.

As illustrated in FIG. 2B, in step 214 the very fine particles are decanted into a mold to a height approximately 3-7 times of desired final thickness. The very fine particles are allowed to sit for ~24 hours. During this time the water will be drained from the slurry into the absorbent mediums used in the molds. Step 214 produces a green body.

In step 216 the green body and mold are allowed to dry in ambient air for ~12 hours. The mold is then placed in a drying oven at 55° C. for another 24 hours. The green body is removed from the mold. To remove the green body the wall or tube is lifted.

In step 218 the green body is placed in an oven in air and heated slowly at 1 degree/minute to 1000 C and held for 1 hour. This heating is to remove any organic material from the casting process.

In step 220 the green body is ready for vacuum sintering. In step 220 the green body is sintered to produce the transparent ceramic. The transparent ceramic has many uses. For example, ceramic parts formed by the method 200 can be used as laser parts. The transparent ceramic can be used for laser gain media slabs, other ceramic laser components.

Figure 3:
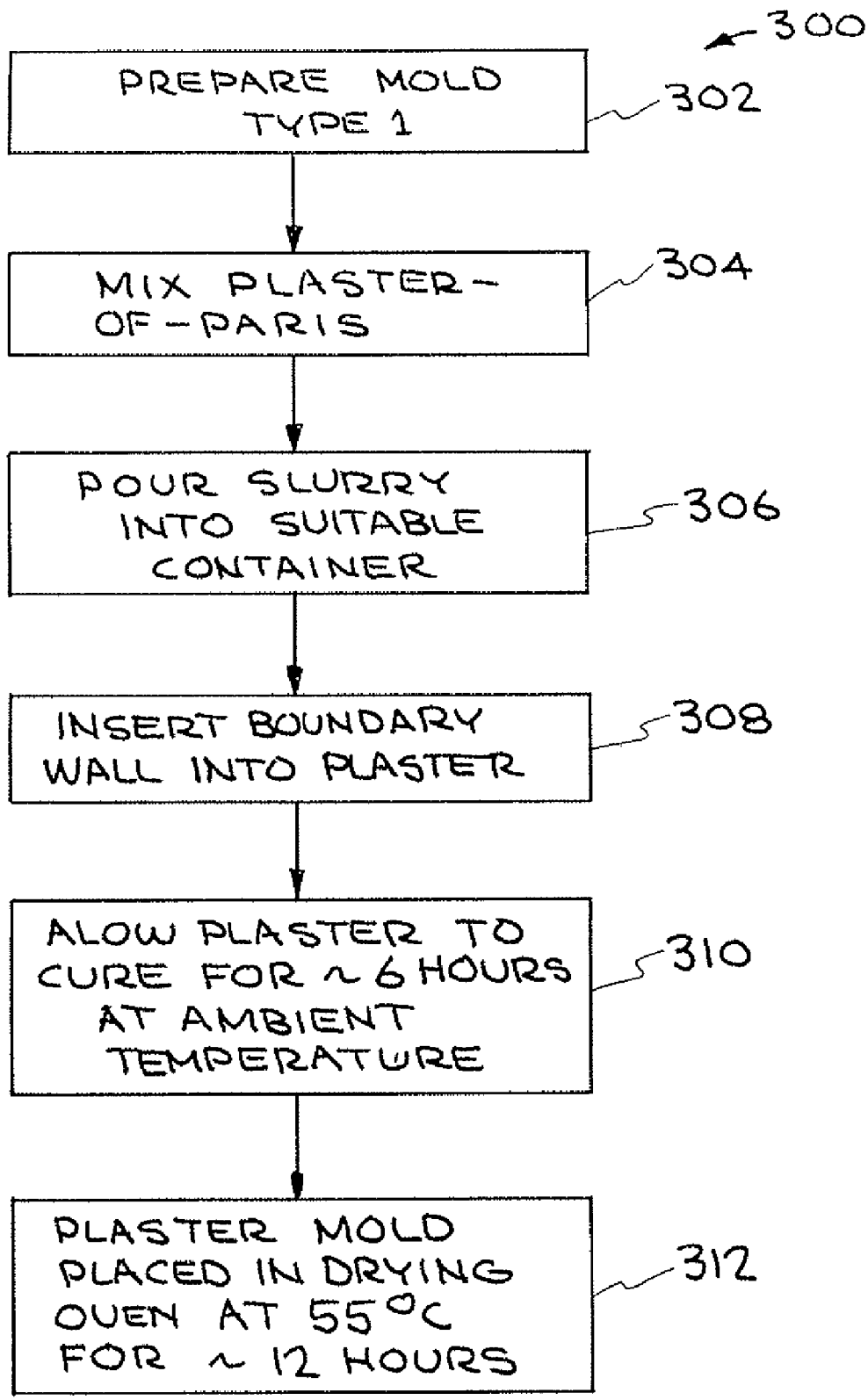
FIG. 3 shows a flow chart outlining steps for forming a type 1 mold.

Referring now to FIG. 3 a flow chart 300 outlining the steps for forming a first or type 1 mold used in creating the green body of the final step 120 and 220 of FIGS. 1 and 2 is shown. In step 302 a mold of type 1 is prepared. In step 304 a mix plaster-of-Paris is prepared. The plaster-of-Paris mix is formed by mixing two parts of plaster-of-Paris by weight to one part by weight water.

In step 306 the plaster slurry is poured into a suitable container. In step 308 a boundary wall is inserted into plaster. In step 310 the plaster is allowed to cure for approximately 6 hours at ambient temperature. In step 312 the mold is placed in a drying oven at 55° c. for approximately 12 hours. After completion of the above steps the mold is ready to receive the fines indicated in FIGS. 1A & 1B and 2A & 2B at steps 112 & 212.

Figure 4:
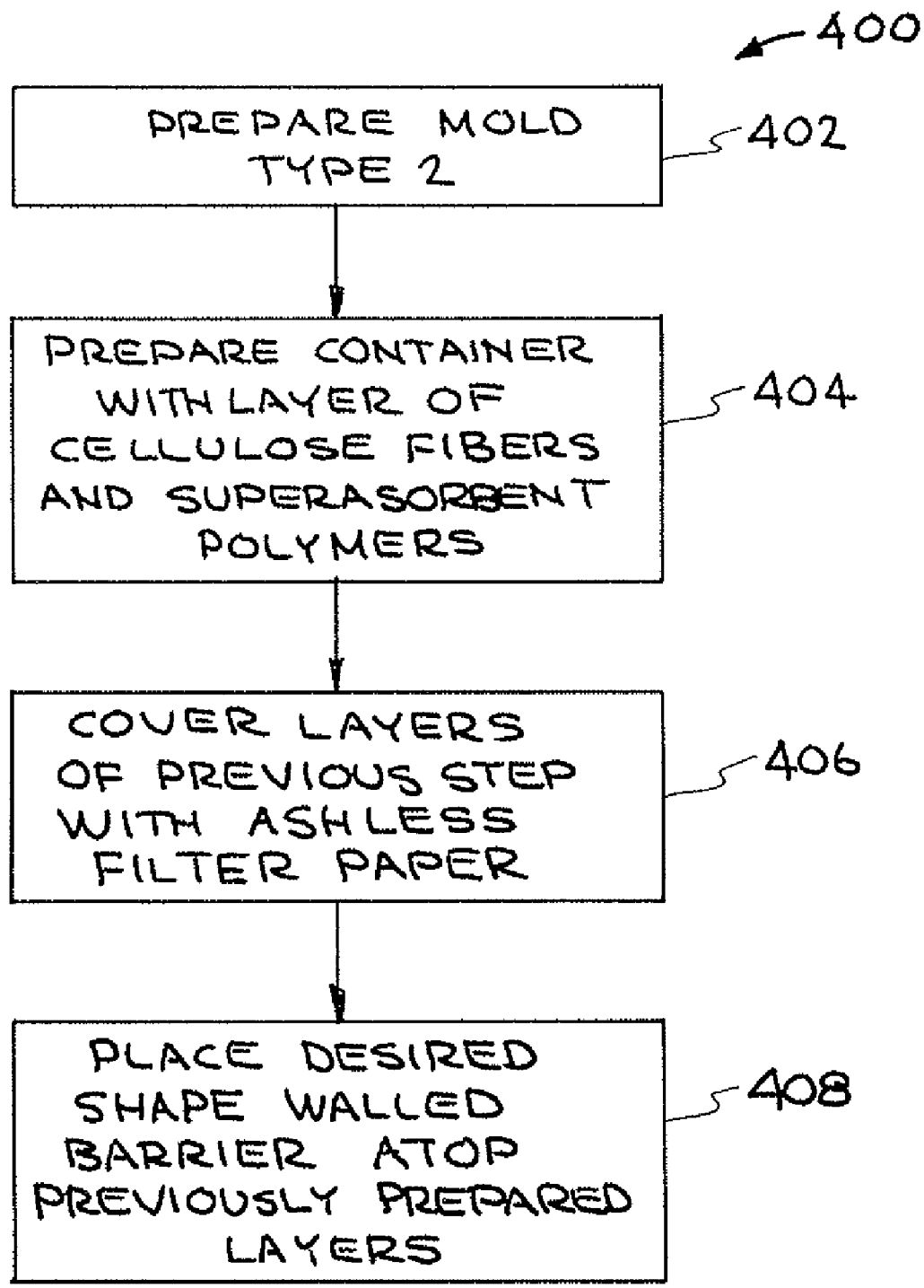
FIG. 4 shows a flow chart outlining steps for forming a type 2 mold.

Referring now to FIG. 4 a flow chart 400 outlining the steps for forming a second or type 2 mold used in creating the green body of the final step 120 and 220 of FIGS. 1 and 2 is shown. In step 402 a mold of type 1 is prepared.

In step 404 a container is prepared with a layer of cellulose fibers and superabsorbent polymers. In step 406 the layers of step 2 are covered with an ashless filter paper. In step 408 a walled barrier of the desired shape for the green body is placed atop the previously prepared layers.

After completion of the above steps the mold is ready to receive the fines indicated in FIGS. 1A & 1B and 2A & 2B at steps 112 & 212.

Figure 5A:
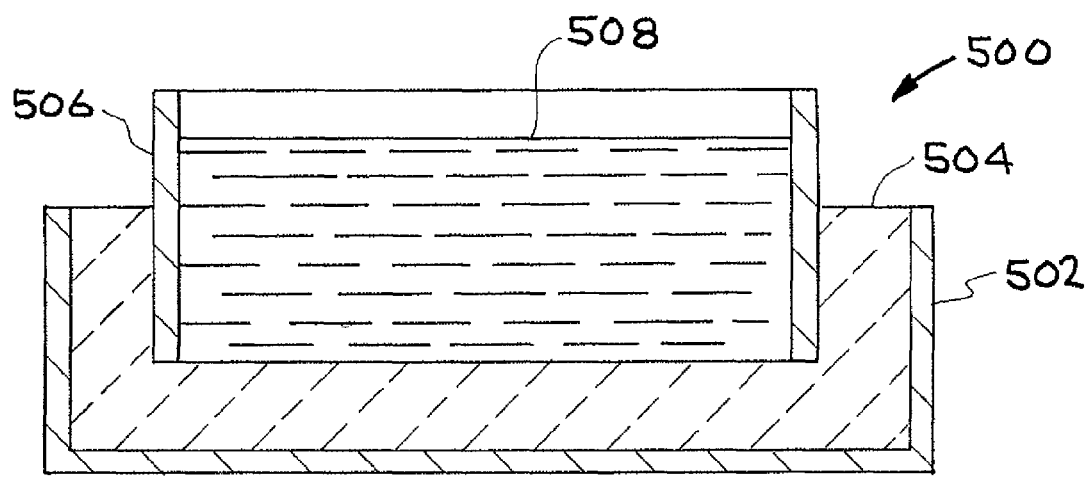
FIGS. 5A and 5B are illustrations of mold of the type 1.
Figure 5B:
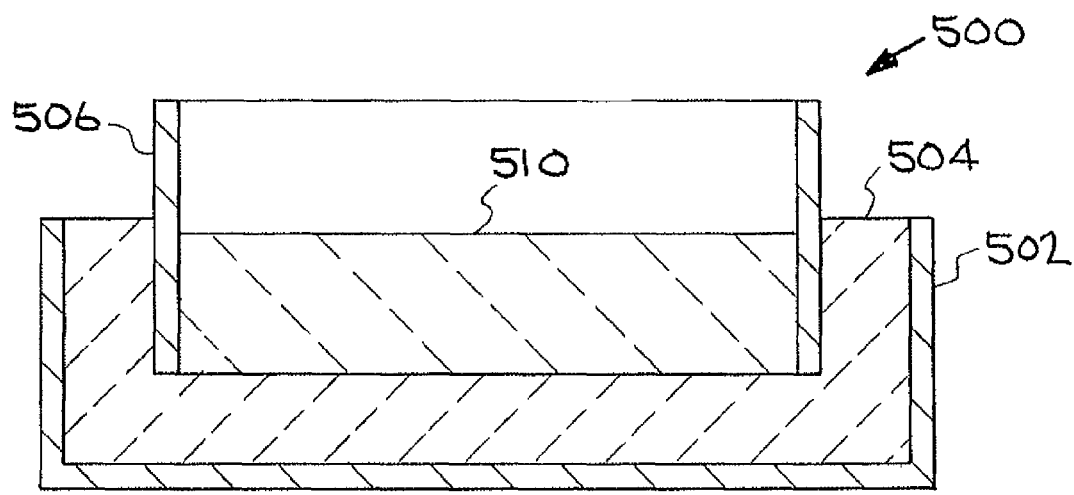

Referring now to FIGS. 5A and 5B mold of type 1 is illustrated. The type 1 mold is designated generally by the reference numeral 500. FIG. 5A is a graphical depiction of a mold of the type 1. A suitable container 502 has been prepared with plaster-of-Paris 504 and a barrier 506 of the desired shape, as outlined in the flow chart 300. The classified suspension (fines) 508 has been decanted into the mold 500. Typically the fines decanted into the mold are 3-7 times final thickness of the part after sintering.

FIG. 5B shows the fines settled into the green body 510 ready for sintering wherein the water has been allowed to drain into the plaster.

Figure 6A:
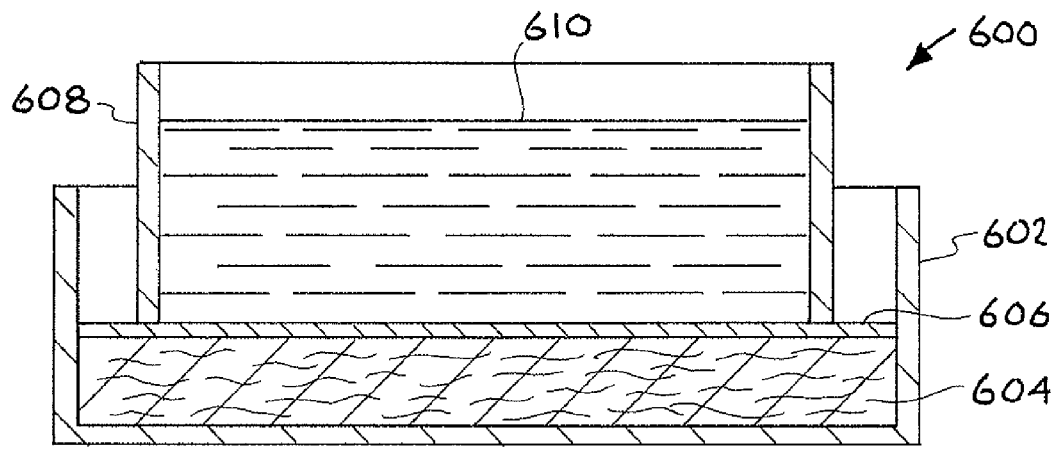
FIGS. 6A and 6B are illustrations of mold of the type 2.
Figure 6B:
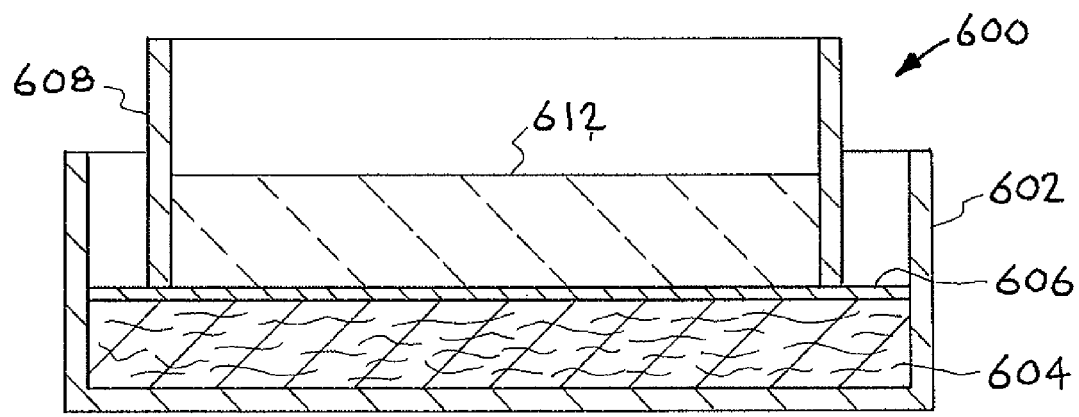

Referring now to FIGS. 6A and 6B mold of type 2 is illustrated. The type 2 mold is designated generally by the reference numeral 600. FIG. 6A is a graphical depiction of a mold of the type 2.

A suitable container 602 has been prepared with layers of cellulose fibers and super absorbent polymers 604 plus the ashless filter paper 608 as outlined in the flow chart 400. The classified suspension (fines) 610 have been decanted into the mold 600. Typically the fines decanted into the mold are 3-7 times the final thickness of the part after sintering.

FIG. 6B shows the fines settled into the green body 610 ready for sintering. The water has been allowed to drain thru the filter paper 606 and be absorbed into the layer 604.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A method of making a transparent ceramic, comprising the steps of:
   providing nano-ceramic powders in a processed or unprocessed form,
   mixing said powders with de-ionized water, said step of mixing said powders with de-ionized water producing a slurry,
   sonifying said slurry to completely wet said powder and suspend said powder in said de-ionized water,
   separating very fine particles from said slurry,
   molding said slurry, and
   curing said slurry to produce the transparent ceramic.

2. The method of making a transparent ceramic of claim 1 wherein said step of providing nano-ceramic powders comprises providing flame spray pyrolysis nano-ceramic powders.

3. The method of making a transparent ceramic of claim 1 wherein said step of providing nano-ceramic powders comprises preparing powders by combustion of organometallic compounds that are heated and calcined to remove organics.

4. The method of making a transparent ceramic of claim 1 wherein said step of mixing said powders with de-ionized water comprises said powders with de-ionized water in the weight ratio of 5.3 parts said powder to 35 parts said de-ionized water.

5. The method of making a transparent ceramic of claim 1 wherein said step of sonifing said slurry comprises using an ultrasonic horn immersed in the slurry for sonifing said slurry.

6. The method of making a transparent ceramic of claim 1 wherein said step of sonifing said slurry comprises using a high shear mixer for sonifing said slurry.

7. The method of making a transparent ceramic of claim 1 wherein said step of separating very fine particles from said slurry comprises allowing said slurry to settle.

8. The method of making a transparent ceramic of claim 1 wherein said step of separating very fine particles from said slurry comprises allowing said slurry to settle producing a liquid suspension containing said very fine particles and larger particles and including decanting said larger particles.

9. The method of making a transparent ceramic of claim 8 wherein said decanted larger particles are discarded.

10. The method of making a transparent ceramic of claim 1 wherein said step of molding said slurry comprises decanting said very fine particles into a mold to a height approximately 3-7 times of desired final thickness of the transparent ceramic.

11. The method of making a transparent ceramic of claim 1 wherein said step of molding said slurry includes allowing said very fine particles sit for at least 24 hours.

12. The method of making a transparent ceramic of claim 1 wherein said step of molding said slurry produces a green body and wherein said green body is placed in an oven in air and heated.

13. The method of making a transparent ceramic of claim 12 wherein said step of heating said green body comprises heating said green body slowly at 1 degree/minute to 1000 C. for 1 hour.

14. The method of making a transparent ceramic of claim 1 wherein said step of curing said slurry to produce the transparent ceramic comprises sintering said slurry to produce the transparent ceramic.

15. The method of making a transparent ceramic of claim 1 wherein said step of curing said slurry to produce the transparent ceramic comprises sintering said slurry to produce a transparent ceramic laser gain media slab.

16. The method of making a transparent ceramic of claim 1 wherein said step of separating very fine particles from said slurry wherein said slurry contains said very fine particles and larger particles and wherein said step of separating very fine particles from said slurry comprises placing said slurry between electrodes in an electrophoresis apparatus and performing electrophoresis resulting in said larger particles being deposited on the electrode.

17. The method of making a transparent ceramic of claim 16 wherein said step of placing said slurry between electrodes in an electrophoresis apparatus comprises placing said slurry between electrodes in an electrophoresis apparatus for substantially one minute resulting in said larger particles being deposited on the electrode, discarding said larger particles, and leaving a remaining suspension of very fine particles.

18. The method of making a transparent ceramic of claim 1 wherein said step of molding said slurry includes the steps of forming a mold by preparing a mix plaster-of-Paris by mixing two parts of plaster-of-Paris by weight to one part by weight water to form a mix and pouring said mix into a container.

19. The method of making a transparent ceramic of claim 18 including the step of inserting a boundry wall into said mix and allowing said mix to cure for approximately 6 hours at ambient temperature.

20. The method of making a transparent ceramic of claim 18 including the step of inserting a boundry wall into said mix and placing said mold in a drying oven at 55°C. for approximately 12 hours.

21. The method of making a transparent ceramic of claim 1 wherein said step of molding said slurry includes the steps of preparing a container with a layer of cellulose fibers and superabsorbent polymers.

22. A method of making a transparent ceramic, comprising the steps of:
    providing nano-ceramic powders in a processed or unprocessed form by preparing powders by combustion of organometallic compounds that are heated and calcined to remove organics,
    mixing said powders with de-ionized water, said step of mixing said powders with de-ionized water producing a slurry,
    sonifing said slurry to completely wet said powder and suspend said powder in said de-ionized water by using an ultrasonic horn immersed in the slurry for sonifing said slurry or using a high shear mixer for sonifing said slurry,
    separating very fine particles from said slurry by allowing said slurry to settle producing a liquid suspension containing said very fine particles and larger particles and including decanting said larger particles,
    molding said slurry, and
    curing said slurry to produce the transparent ceramic.

23. A method of making a transparent ceramic, comprising the steps of:
    providing nano-ceramic powders in a processed or unprocessed form by preparing powders by combustion of organometallic compounds that are heated and calcined to remove organics,
    mixing said powders with de-ionized water, said step of mixing said powders with de-ionized water producing a slurry,
    sonifing said slurry to completely wet said powder and suspend said powder in said de-ionized water by using an ultrasonic horn immersed in the slurry for sonifing said slurry or using a high shear mixer for sonifing said slurry,
    separating very fine particles from said slurry by allowing said slurry to settle producing a liquid suspension containing said very fine particles and larger particles and including decanting said larger particles,
    molding said slurry by forming a mold by preparing a mix plaster-of-Paris by mixing two parts of plaster-of-Paris by weight to one part by weight water to form a mix and pouring said mix into a container, and
    curing said slurry to produce the transparent ceramic.

24. A method of making a transparent ceramic, comprising the steps of:
    providing nano-ceramic powders in a processed or unprocessed form by preparing powders by combustion of organometallic compounds that are heated and calcined to remove organics,
    mixing said powders with de-ionized water, said step of mixing said powders with de-ionized water producing a slurry,
    sonifing said slurry to completely wet said powder and suspend said powder in said de-ionized water by using an ultrasonic horn immersed in the slurry for sonifing said slurry or using a high shear mixer for sonifing said slurry,
    separating very fine particles from said slurry by allowing said slurry to settle producing a liquid suspension containing said very fine particles and larger particles and including decanting said larger particles, molding said slurry by forming a mold by preparing a container with a layer of cellulose fibers and superabsorbent polymers, and
    curing said slurry to produce the transparent ceramic.

* * * * *